United States Patent [19]

Sabatino

[11] 4,037,030
[45] July 19, 1977

[54] STORAGE BATTERY AND METHOD OF FORMING THE SAME

[75] Inventor: Anthony Sabatino, St. Paul, Minn.

[73] Assignee: Gould Inc., Rolling Meadows, Ill.

[21] Appl. No.: 563,840

[22] Filed: Mar. 31, 1975

[51] Int. Cl.$^2$ ............................................. H01M 2/18
[52] U.S. Cl. ............................................. 429/139
[58] Field of Search .............. 136/6 B, 166, 147, 175, 136/176, 181, 79–81; 429/136–139

[56] References Cited

U.S. PATENT DOCUMENTS

| | | | |
|---|---|---|---|
| 2,490,630 | 12/1949 | Jardine | 136/147 |
| 2,866,841 | 12/1958 | Zahn | 136/147 |
| 2,934,502 | 4/1960 | Zahn | 136/147 |
| 2,934,585 | 4/1960 | Wilson | 136/17 |
| 3,253,954 | 5/1966 | Banas | 136/54 |
| 3,269,865 | 8/1966 | Swanson | 136/179 X |
| 3,333,986 | 8/1967 | Chreitzberg et al. | 136/147 X |
| 3,350,238 | 10/1967 | Wilson | 136/80 X |
| 3,450,566 | 6/1969 | Solomon et al. | 136/147 X |
| 3,455,739 | 7/1969 | Field | 136/147 X |
| 3,476,612 | 11/1969 | Tench | 136/147 |
| 3,514,331 | 5/1970 | Cupp et al. | 136/6 |
| 3,556,862 | 1/1971 | Fox | 136/176 |
| 3,635,766 | 1/1972 | Quisling | 136/166 |
| 3,663,721 | 5/1972 | Blondel et al. | 136/6 B |

*Primary Examiner*—C. F. Lefevour
*Attorney, Agent, or Firm*—Leydig, Voit, Osann, Mayer & Holt, Ltd.

[57] ABSTRACT

A maintenance free storage battery has a plurality of alternately positive and negative plates disposed within an electrolyte in a battery container, with the plates resting on the bottom of the container. A battery separator material is disposed between each pair of adjacent plates with the bottom of the separator material forming openings to permit access of a bonding material to the lower edges of the plates. A bonding material adhered to both the bottom wall of the battery container and the lower edges of the plates extends through the bottom openings formed by the separator material to provide vibration resistance, with the bonding material also sealing the bottom openings to prevent the treeing of active material between positive and negative plates at the bottom of the container. In one embodiment the separator material is in the form of envelopes around alternate plates with each envelope being sealed along the vertical edges of the plate and having slots along the lower edge of the plate to form the bottom openings to permit access of the bonding material to the lower portions of the plates inside the envelopes. As an alternative, the separator material may be in the form of open-bottomed sleeves. When the plates and separators are first inserted into the battery container, the bonding material is in a liquid state so that the lower edges of the plates and the separators are submerged in the liquid which flows through the openings and into contact with the plates. The bonding material is then solidified to seal the openings.

8 Claims, 9 Drawing Figures

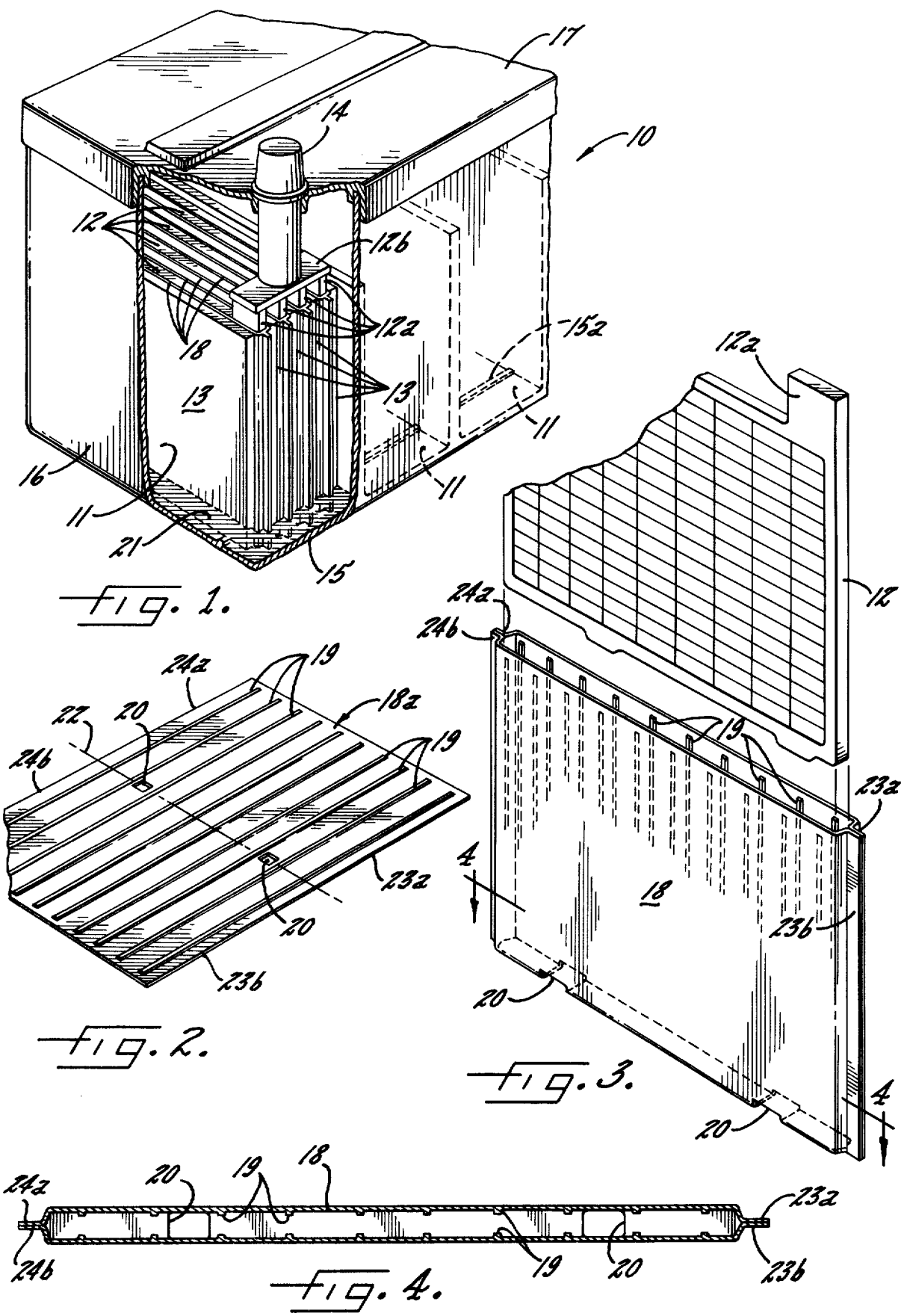

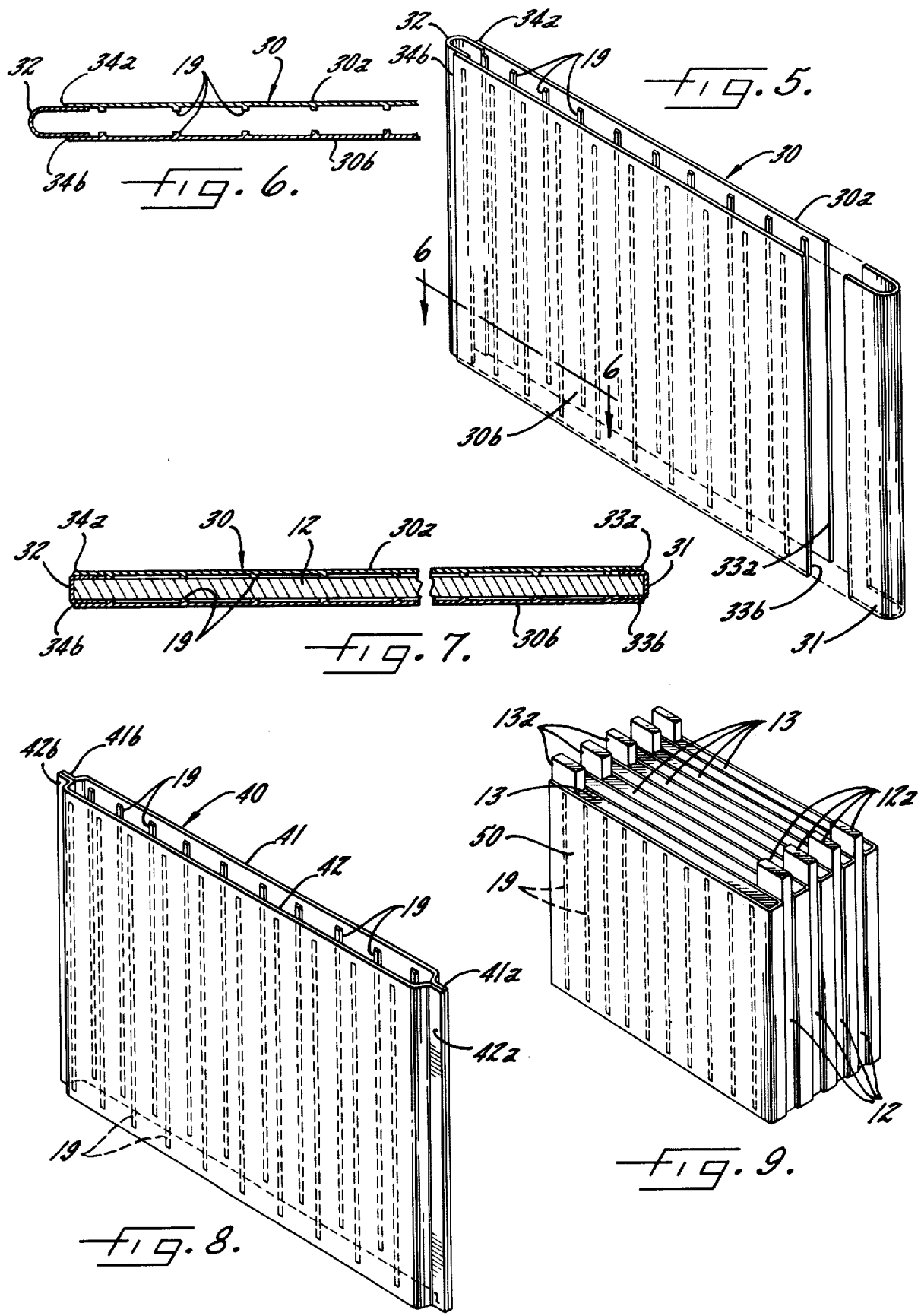

STORAGE BATTERY AND METHOD OF FORMING THE SAME

DESCRIPTION OF THE INVENTION

The present invention relates generally to storage batteries, and particularly to storage batteries which are maintenance free and/or resistant to vibration.

The term "maintenance free" as applied to storage batteries refers to a battery which does not require the addition of any water or other liquid during the life of the battery, due to the use of a special alloy in the battery plates. These maintenance free batteries are normally constructed with the plates resting directly on the bottom of the battery container so that there is space for an extra reservoir of electrolyte above the plates, and with the plates contained in open-top envelopes to prevent active material which drops to the bottom of the container from "treeing" between positive and negative plates and causing shorting. In heavy duty storage batteries, it is normally preferred to have the bottoms of the plates bonded to the battery container to provide vibration resistance. This type of bonding is not practical in maintenance free batteries, however, because it is the envelopes around the lower portions of the plates that become bonded to the container, and the plates are still free to vibrate within their envelopes. In one previous attempt to solve this problem, the battery container has been bonded to the exposed tops of the plates, but this construction has not been completely satisfactory.

It is a primary object of the present invention to provide an improved maintenance free storage battery that has the battery plates firmly secured to the battery container so that the plates are resistant to vibration.

It is another important object of the invention to provide such an improved maintenance free and/or vibration resistant storage battery which prevents "treeing" of active material between positive and negative plates at the bottom of the container, so that there can be no shorting between the positive and negative plates.

A further object of the invention is to provide such an improved maintenance free and/or vibration resistant battery which can be efficiently and economically manufactured at high production rates.

Other objects and advantages of the invention will be apparent from the following detailed description together with the accompanying drawings, in which:

FIG. 1 is a fragmentary perspective view, partially in section, of a storage battery embodying the invention;

FIG. 2 is a plan view of a blank used to form one of the plate envelopes used in the battery of FIG. 1;

FIG. 3 is an enlarged exploded perspective view of one of the plates and one of the envelopes used in the battery of FIG. 1;

FIG. 4 is a section taken along line 4—4 in FIG. 3;

FIG. 5 is an enlarged perspective view, exploded at one end, of a plate sleeve suitable for use in the battery of FIG. 1;

FIG. 6 is a section taken along line 6—6 in FIG. 5;

FIG. 7 is the same section shown in FIG. 6 showing the sleeve after a plate has been inserted therein;

FIG. 8 is an enlarged perspective view of an alternative plate sleeve suitable for use in the battery of FIG. 1; and FIG. 9 is a perspective view of an alternative plate and separator assembly suitable for use in the battery of FIG. 1.

While the invention will be described in connection with certain preferred embodiments, it will be understood that it is not intended to limit the invention to those particular embodiments. On the contrary, it is intended to cover all alternatives, modifications, and equivalents as may be included within the spirit and scope of the invention as defined by the appended claims.

Turning now to the drawings and referring first to FIG. 1, there is shown a storage battery 10 having a plurality of partitioned cells 11 each of which contains four positive plates 12 and five negative plates 13. Of course, any desired number of plates may be used. The positive plates 12 are all interconnected via lugs 12a and a connector 12b with an external positive terminal 14. The negative plates 13 are also interconnected by similar means (not shown) as is well known in the art. The illustrative battery 10 is a maintenance free battery, with the plates 12 and 13 all resting on short ribs 15a on the bottom wall 15 of the battery container 16 so as to provide space for an extra reservoir of electrolyte between the top edges of the plates 12 and 13 and the top wall 17 of the container. Furthermore, each adjacent pair of positive and negative plates are separated by envelopes 18 which surround the positive plates 12 to prevent active material which drops to the bottom of the container 16 from "treeing" between the positive and negative plates and causing shorting. The envelopes 18 are made of conventional battery separator material having ribs 19 on the inside surfaces thereof and bearing against the positive plates 12 contained therein. While the invention will be described with particular reference to maintenance free batteries, the invention is also applicable to other types of storage batteries.

In accordance with one important aspect of the present invention, the bottoms of the plate envelopes form openings to permit a bonding material on the bottom of the battery container to anchor the plates to the container, with the bonding material also sealing the bottom openings in the envelope to prevent the treeing of active material between positive and negative plates at the bottom of the container. Thus, in the illustrative embodiment of FIGS. 1–4, the envelope 18 around each positive plate 12 is sealed along the vertical edges of the plate but forms a pair of holes or slots 20 along the lower edge of the plate. When the enveloped plate 12 is placed in the battery container 16, the bottom of the envelope 18 is submerged in a layer of liquid bonding material 21, suitably an epoxy compound, which flows through the holes 20 and into contact with the lower edge of the plate 12. The number, size, shape and location of the holes 20 are not critical, as long as they permit the liquid bonding material to flow into contact with the enveloped plates 12.

After the bonding material solidifies, it adheres to both the bottom wall 15 of the battery container and the plate 12, thereby firmly anchoring the plate 12 to the container to provide the desired vibration resistance. Furthermore, the liquid level of the bonding material 21 is above the uppermost edges of the holes 20 so that the bonding material also seals the holes 20 to prevent any active material that drops down to the bottom of the envelope 18 from escaping from the envelope and forming a conductive path between the enveloped positive plate 12 and one of the adjacent negative plates 13.

The particular envelope 18 illustrated in FIGS. 1–4 is suitably formed from a blank 18a of separator material as illustrated in FIG. 2. The holes 20 are illustrated as being pre-formed in this blank 18a along a central fold line 22, but if desired the holes may be formed in the finished envelope either before or after the insertion of the battery plate therein. To form the envelope 18, the blank 18a is folded along line 22, and the resulting overlapped vertical edges 23a, 23b and 24a, 24b are sealed to each other to form the desired envelope 18. The sealing of the vertical edges may be effected by heat sealing a thermoplastic separator material, by ultrasonic sealing, by the use of suitable adhesives, or by any other suitable means. It is generally preferred to keep the width of the seal as narrow as possible while forming a reliable liquid-tight seal. The envelopes may be pre-formed before the plates are inserted therein, or the blanks 18a may be folded around the plates so that the plates are enveloped during the forming of the envelopes.

In accordance with a further aspect of the invention, the separator material forms open-bottomed sleeves rather than envelopes with the vertical edges of the sleeves being formed by strips of heat shrinkable plastic film so that the sleeves can be shrunk snugly around the plates therein. Thus, as illustrated in FIGS. 5–7, a sleeve 30 may be formed from two sheets 30a and 30b of separator material having their vertical edges joined to a pair of strips 31 and 32 of heat shrinkable plastic film. More specifically, the two heat shrinkable strips 31 and 32 are folded and sealed to the two pairs of vertical edges 33a, 33b and 34a, 34b of the two side sheets 30a and 30b. In their original form, these two folded heat shrinkable strips 31 and 32 form lateral extensions of the sleeve 30, thereby facilitating the insertion of a battery plate 12 therein. However, after the plate is inserted in the sleeve 30, the vertical edges are heated to shrink the two strips 31 and 32 so that they contract transversely against the vertical edges of the pate 12, as illustrated in FIG. 7. The sleeve 30 thus fits snugly over the plate 12 to minimize the possibility of the sleeve riding up over the plate. This construction also minimizes the space occupied by the sleeve 30 along the vertical edges of the plate 12, thereby permitting the width of the plate to be maximized for any given size of battery container. The open bottom end of the sleeve 30 permits access of the bonding material to the plate 12 disposed within the sleeve, with the bottom of the sleeve being sealed when the bonding material solidifies. If desired, the heat shrinkable ends can also be used in the envelope type separators illustrated in FIGS. 1–4.

An alternative form of sleeve is illustrated in FIG. 8. In this embodiment, an open-bottomed sleeve 40 is formed by heat sealing two sheets 41 and 42 of separator material along their adjacent vertical edges 41a, 42a and 41b, 42b. As in the case of the envelopes 18 shown in FIGS. 1–4, the sleeve 40 may be pre-formed or it may be formed around the plate to be contained therein.

In accordance with a further modified embodiment of the invention, the positive and negative plates are separated by a single strip of separator material which is woven back and forth between successive pairs of adjacent plates so that the strip is folded around one vertical edge of each positive plate on one side of the plate group in each cell, and around one vertical edge of each negative plate on the other side of the plate group in that cell. The bottom edge of the woven strip leaves the bottom edges of all the plates completely open for access to the bonding material. Thus, in the modified embodiment illustrated in FIG. 9, a single strip 50 of separator material is wound back and forth between successive pairs of the adjacent positive and negative plates 12 and 13. It can be seen that this configuration leaves the right-hand vertical edges of all the positive plates 12 exposed while the intervening right-hand vertical edges of the negative plates 13 are enclosed by the folds of the woven strip 50. Similarly, the left-hand vertical edges of all the negative plates 13 are exposed while the intervening left-hand vertical edges of the positive plates 12 are enclosed within the folds of the strip 50. In effect, this construction provides sleeves for all the plates, but the sleeves are closed along only one vertical edge of each plate. Of course, the effect of this construction is to prevent any active material from forming a conductive path between any pair of adjacent plates of opposite pluralities.

In the construction of FIG. 9, the bottom edge of the strip 50 leaves the entire lower edge of each plate completely exposed. Consequently, when this separator-plate assembly is inserted into the battery container 16, the entire lower edge of each and every plate is submerged in the layer of liquid bonding material 21 along with the lower edges of the woven strip 50. When the bonding material 21 solidifies, it not only bonds each plate to the bottom wall 15 of the battery container, but also closes the lower end of each plate sleeve, thereby providing the desired seal to prevent treeing of active material between positive and negative plates at the bottom of the container.

If desired, the plate edge or edges may be sealed only at the lower portions of the plates where the active material collects. For example, the envelopes 18 of FIGS. 1–4 or the sleeves 30 and 40 of FIGS. 5–8 may be sealed only along the lower 30% of the plates to form a pocket for containing the active material and preventing it from treeing across to the adjacent plates.

As can be seen from the foregoing detailed description, this invention provides an improved maintenance free storage battery that has the battery plates firmly secured to the battery container by means of the bonding material, so that the plates are resistant to vibration even in heavy duty applications. Because the bonding material itself seals the separator openings through which the bonding material gains access to the plate, the final battery assembly prevents treeing of active material between positive and negative plates at the bottom of the container so that there can be no shorting between the positive and negative plates. Because of the facility with which the separators can be formed, with the plates being pre-inserted in the separators if desired, this improved battery can be efficiently and economically manufactured at high production rates.

I claim as my invention:
1. A storage battery comprising the combination of
  a. a plurality of alternately positive and negative plates disposed within an electrolyte in a battery container, said plates resting on the bottom of said container,
  b. a battery separator material in the form of envelopes around at least alternate plates with each envelope being sealed along at least the lower portions of the vertical edges of the plate and at least partially open along the lower edge of the plate to form bottom openings to permit access of a bonding material to the lower edge of the plate, and
  c. a bonding material adhered to both the bottom wall of the battery container and the lower edges of the plates and extending through the bottom openings formed by said envelopes, said bonding material also sealing said bottom openings to prevent the treeing of active material between positive and negative plates at the bottom of the container.

2. A storage battery as set forth in claim 1 wherein each envelope is formed by a folded flexible sheet of separator material having the side edges of the separator material sealed to each other, said separator material having openings formed in the region of the fold to form said bottom openings for the bonding material.

3. A storage battery comprising the combination of
   a. a plurality of alternately positive and negative plates disposed within an electrolyte in a battery container, said plates resting on the bottom of said container,
   b. a battery separator material in the form of sleeves around at least alternate plates with each sleeve being sealed along at least the lower portions of the vertical edges of the plate and completely open along the lower edge of the plate to form a bottom opening to permit access of a bonding material to the lower edges of the plate,
   c. a bonding material adhered to both the bottom wall of the battery container and the lower edges of the plates and extending through the bottom openings formed by said sleeves, said bonding material also sealing said bottom openings to prevent the treeing of active material between positive and negative plates at the bottom of the container.

4. A storage battery as set forth in claim 3 wherein the vertical edges of each sleeve are formed by strips of heat shrinkable plastic film so that the sleeve can be shrunk snugly against the plate contained therein.

5. A method of forming a storage battery comprising the steps of
   a. forming a layer of liquid bonding material on the bottom of a battery container,
   b. placing a plurality of alternately positive and negative plates within said container with the plates resting on the container bottom and with a battery separator material in the form of envelopes around at least alternate plates with each envelope being sealed along at least the lower portions of the vertical edges of the plate and at least partially open along the lower edge of the plate to form bottom openings to permit access of the bonding material to the lower edge of the plate so that the bonding material adheres to both the container bottom and the lower edges of the plates, the bonding material having sufficient depth to seal said openings to prevent the treeing of active material between positive and negative plates on the container bottom, and
   c. solidifying the liquid bonding material.

6. A method of forming a storage battery as set forth in claim 5 wherein each envelope is formed by a folded sheet of separator material having the side edges of the separator material sealed to each other, said separator material having openings formed in the region of the fold to form said bottom openings for the bonding material.

7. A method of forming a storage battery comprising the steps of
   a. forming a layer of liquid bonding material on the bottom of a battery container,
   b. placing a plurality of alternately positive and negative plates within said container with the plates resting on the container bottom and with a battery separator material in the form of sleeves around at least alternate plates with each sleeve being sealed along at least the lower portions of the vertical edges of the plate and completely open along the lower edge of the plate to form a bottom opening to permit access of the bonding material to the lower edges of the plates so that the bonding material adheres to both the container bottom and the lower edges of the plates, the bonding material having sufficient depth to seal said openings to prevent the treeing of active material between positive and negative plates on the container bottom, and
   c. solidifying the liquid bonding material.

8. A method of forming a storage battery as set forth in claim 7 wherein the vertical edges of each sleeve are formed by strips of heat shrinkable plastic film so that the sleeve can be shrunk snugly against the plate contained therein.

* * * * *